(12) United States Patent
Kramer

(10) Patent No.: US 6,437,517 B1
(45) Date of Patent: Aug. 20, 2002

(54) METHOD AND SYSTEM FOR EXCITING AN AZIMUTHAL ACOUSTIC AND LONGITUDINAL ACOUSTIC COMBINATION MODE

(75) Inventor: Jerry Martin Kramer, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1 day.

(21) Appl. No.: 09/791,193

(22) Filed: Feb. 22, 2001

(51) Int. Cl.[7] .............................................. H05B 37/00
(52) U.S. Cl. ....................................... 315/246; 315/291
(58) Field of Search ................................. 315/246, 248, 315/307, 291; 332/120, 149, 117, 119

(56) References Cited

U.S. PATENT DOCUMENTS

| | | |
|---|---|---|
| 4,864,180 A | 9/1989 | English et al. ................ 313/44 |
| 5,121,034 A | 6/1992 | Allen et al. .................. 315/246 |
| 5,306,987 A | 4/1994 | Dakin et al. ................. 315/248 |
| 5,436,533 A * | 7/1995 | Fromm et al. ............... 315/246 |
| 5,684,367 A | 11/1997 | Moskowitz et al. ......... 315/246 |
| 5,773,937 A | 6/1998 | Miyazaki et al. ............ 315/246 |
| 5,880,561 A | 3/1999 | Miyazaki et al. ........ 315/209 R |
| 5,998,939 A * | 12/1999 | Fellows ....................... 315/246 |
| 6,184,633 B1 * | 6/2001 | Kramer ....................... 315/246 |

FOREIGN PATENT DOCUMENTS

EP     0 984 670 A2    8/2000

* cited by examiner

Primary Examiner—Tho Phan
Assistant Examiner—Wilson Lee

(57) ABSTRACT

Power source systems implementing methods for reducing vertical segregation (color mixing) in a long and thin high intensity discharge lamp are disclosed. Each system provides a current frequency signal to the lamp that excites an azimuthal acoustic and longitudinal acoustic combination mode of the lamp whereby color mixing within the lamp can be achieved. Each system further adjusts the current frequency signal as needed to stabilize color mixing within the lamp.

40 Claims, 8 Drawing Sheets

METHOD AND SYSTEM FOR EXCITING AN AZIMUTHAL ACOUSTIC AND LONGITUDINAL ACOUSTIC COMBINATION MODE

BACKGROUND OF THE INVENTION

1. Field of the Invention

The present invention generally relates to reducing vertical segregation in a high intensity discharge (HID) lamp. The present invention specifically relates to reducing vertical segregation by an excitation of an azimuthal acoustic and longitudinal acoustic combination mode of the HID lamp.

2. Description of the Related Art

Acoustic resonances are driven by a periodic power input. For sinusoidal type waveforms, the power frequency that excites an acoustic resonance is at twice the current frequency.

A reduction of vertical segregation (color mixing) in a HID lamp has previously been accomplished by exciting the $2^{nd}$ longitudinal acoustic mode of the lamp. For, a long and thin burner, the frequency to excite the $2^{nd}$ longitudinal acoustic mode of the HID lamp is lower than both the frequency to excite the $1$st azimuthal acoustic mode of the HID lamp and the frequency to excite the $1^{st}$ radial acoustic mode of the HID lamp. Prior to exciting the $2^{nd}$ longitudinal acoustic mode of the HID lamp, the HID lamp is initially stabilized by repeatedly sweeping a current frequency signal over a frequency range extending between a current frequency corresponding to the $1^{st}$ azimuthal acoustic mode of the HID lamp and a current frequency corresponding to the $1^{st}$ radial acoustic mode of the HID lamp.

For example, for a 70 watt HID lamp having a 4 millimeter inner diameter and a 19 millimeter inner length, the current frequency and the power frequency corresponding to the $1^{st}$ azimuthal acoustic mode of the 70 watt HID lamp is 31.5 kilohertz and 63 kilohertz, respectively, and the current frequency and the power frequency corresponding to the $1^{st}$ radial acoustic mode of the 70 watt HID lamp is 65.5 kilohertz and 131 kilohertz, respectively. One prior art method for initially stabilizing the 70 watt HID lamp sweeps the current frequency signal from approximately 45 kilohertz to 55 kilohertz every 10 milliseconds within an initial operating time period.

Upon an expiration of the initial operating time period, one prior art method for exciting the $2^{nd}$ longitudinal acoustic mode of the 70 watt HID lamp utilizes an amplitude modulation of the current frequency sweep signal. The current frequency and the power frequency corresponding to the $2^{nd}$ longitudinal acoustic mode of the 70-watt HID lamp are 12 kilohertz and 24 kilohertz, respectively. The resulting power frequencies are a power frequency sweep with 2 swept sidebands and a fixed power frequency at the amplitude modulation frequency, which is adjusted to correspond to the power frequency of 24 kilohertz to excite the $2^{nd}$ longitudinal acoustic mode of the 70 watt HID lamp. A potential problem however with this prior art method is the required complexity of a circuit to implement the method.

Another prior art method cycles a current frequency sweep signal of 45 kilohertz to 55 kilohertz for a first time period followed by a fixed current frequency signal of 12 kilohertz for a second time period. The resulting power frequencies are a power frequency sweep of 90 kilohertz to 110 kilohertz during the first time period of each cycle and a fixed power frequency of 24 kilohertz during the second time period of each cycle. A potential problem however with this prior art method is also the required complexity of a circuit to implement the method.

In particular, one prior art circuit includes a bridge for cyclically generating a current frequency sweep signal in the form of a square wave at 45 kilohertz to 55 kilohertz for the first time period of each cycle and a fixed current frequency signal in the form of a square wave at 12 kilohertz for the second time period of each cycle. The circuit preferably includes a low pass filter for transforming the square waves to sine waves by attenuating the $3^{rd}$ harmonic, the $5^{th}$ harmonic and higher harmonics of the square waves. While the low pass filter passes the fundamental current frequency sweep signal of 45 kilohertz to 55 kilohertz without any appreciable attenuation during the first time period of each cycle, the low pass filter fails to attenuate the $3^{rd}$ harmonic at 36 kilohertz and the $5^{th}$ harmonic at 60 kilohertz of the fixed current frequency signal of 12 kilohertz during the second time period of each cycle. The result is the 70 watt HID lamp receives a fixed current frequency signal of 12 kilohertz having a square wave during the second time period of each cycle that fails to excite the $2^{nd}$ longitudinal acoustic mode of the 70 watt HID lamp. A higher order filter, or a phase modulation can overcome the shortcomings of the low pass filter, but at an increase to the complexity of the circuit.

Color mixing results in light technical properties of long and thin lamps being approximately equal in a vertical orientation and a horizontal orientation. Color mixing can also significantly reduce the color temperature or increase the efficacy in vertical orientation. It is therefore desirable to provide a method and system for achieving color mixing with a circuit having a less complex design than prior art circuits.

SUMMARY OF THE INVENTION

The present invention relates to a method and system for exciting an azimuthal acoustic and longitudinal acoustic combination mode of a high intensity discharge lamp. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

A first form of the present invention is a power source system for reducing vertical segregation in a high intensity discharge lamp. The system comprises a power source and a controller. The power source is operable to provide a current frequency signal to the lamp to excite an azimuthal acoustic and longitudinal acoustic combination mode of the lamp. The controller is operable to control the current frequency signal to stabilize a reduction in vertical segregation within the lamp.

A second form of the present invention is a first power source for reducing vertical segregation in a high intensity discharge lamp. The power source comprises a bridge and a low pass filter. The bridge is operable to provide a first current frequency sweep signal in the form of a square wave. In response to the first current frequency sweep signal, the low pass filter is operable to provide a second current frequency sweep signal in the form of a sine wave to the lamp, wherein the second current frequency sweep signal has a frequency range to excite an azimuthal acoustic and longitudinal acoustic combination mode of the lamp.

A third form of the present invention is a second power source for reducing vertical segregation in a high intensity discharge lamp. The power source comprises a pair of signal generators and an adder. The first signal generator is operable to provide a fixed current frequency signal. The second signal generator is operable to provide a current frequency sweep signal. The adder is operable to provide a current frequency signal as a function of the fixed current frequency signal and the current frequency sweep signal to the lamp, wherein the current frequency signal excites an azimuthal acoustic and longitudinal acoustic combination mode of the lamp.

A fourth form of the present invention is a first method for reducing vertical segregation in a high intensity discharge lamp. A current frequency signal is provided to the lamp, wherein the current frequency signal excites an azimuthal acoustic and longitudinal acoustic combination mode of the lamp. The current frequency signal is controlled to stabilize a reduction in vertical segregation in the lamp.

A fifth form of the present invention is a second method for reducing vertical segregation in a high intensity discharge lamp. A first current frequency sweep signal in the form of a square wave is provided. A second current frequency sweep signal in the form of a sine wave as a function of the first current frequency sweep signal is provided to the lamp, wherein the second current frequency sweep signal has a frequency range to excite an azimuthal acoustic and longitudinal acoustic combination mode of the lamp.

A sixth form of the present invention is a third method for reducing vertical segregation in a high intensity discharge lamp. A first current frequency sweep signal is provided to the lamp during a first time period, wherein the first current frequency sweep signal has a frequency range to stabilize an operation of the lamp. A current frequency signal is provided to the lamp during a second time period, wherein the second current frequency sweep signal excites an azimuthal acoustic and longitudinal acoustic combination mode of the lamp.

A seventh form of the present invention is a fourth method for reducing vertical segregation in a high intensity discharge lamp. A current frequency sweep signal is provided. A fixed current frequency signal is provided. A current frequency signal as a function of the fixed current frequency signal and the current frequency sweep signal is provided to the lamp, wherein the current frequency signal excites an azimuthal acoustic and longitudinal acoustic combination mode of the lamp.

The foregoing forms and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENTLY PREFERRED EMBODIMENTS

Figure 1:
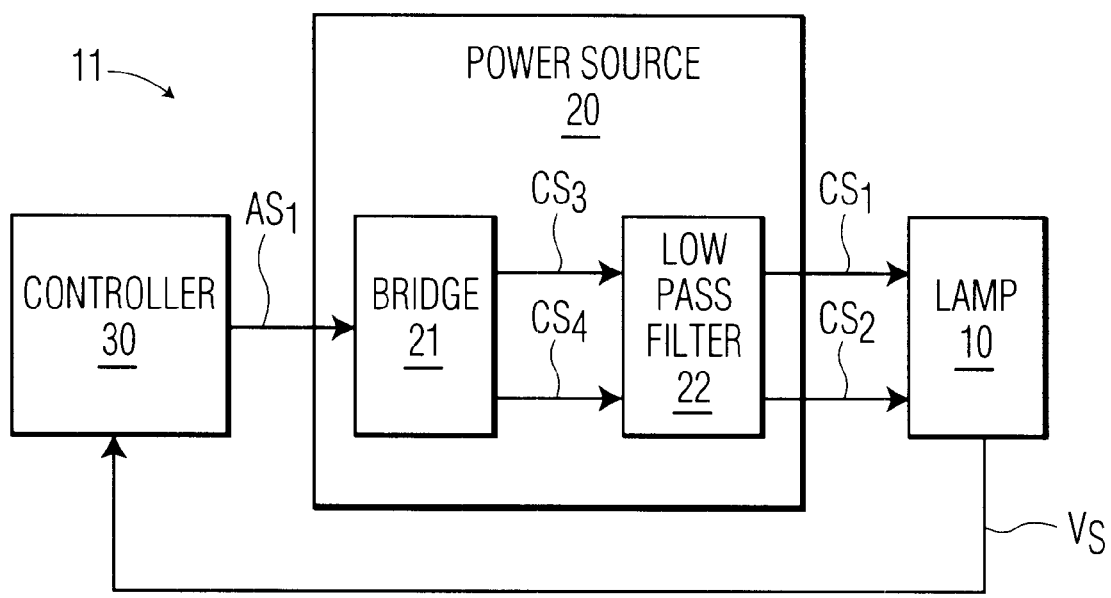
FIG. 1 is a block diagram of a power source system employed to drive a gas discharge lamp in accordance with the present invention.

Referring to FIG. 1, a power source system 11 for stabilizing an operation of a long and thin high intensity discharge lamp 10 and for reducing vertical segregation (color mixing) within lamp 10 is shown.

System 11 provides a current signal $CS_1$ to lamp 10 during an initial operating period of lamp 10, whereby operational stabilization of lamp 10 is achieved by current signal $CS_1$ having a frequency sweep that corresponds to a power frequency sweep (which is twice the frequency sweep of current signal $CS_1$) between the frequency of the $1^{st}$ azimuthal acoustic mode of lamp 10 and the frequency of the $1^{st}$ radial acoustic mode of lamp 10. System 11 thereafter provides current signal CS, and a current signal $CS_2$ in a time sequential manner to lamp 10, whereby operational stabilization and color mixing within lamp 10 are achieved by current signal $CS_2$ having a frequency sweep that corresponds to a power frequency sweep (which is twice the frequency sweep of current signal $CS_2$) to excite an azimuthal acoustic and longitudinal acoustic combination mode of lamp 10 that is above the frequency of the $1^{st}$ radial acoustic mode of lamp 10.

More specifically relating to color mixing, the frequencies $f_r$ for azimuthal acoustic and radial acoustic modes of lamp 10 are equal to $(\acute{a}C_r)/(2\pi r)$, where $\acute{a}$ is a constant that is determined by a specific azimuthal or radial acoustic mode of lamp 10, $C_r$ is an average speed of sound in a radial plane of lamp 10, and r is the inner diameter of lamp 10. The $\acute{a}$ constant for the $1^{st}$ radial acoustic mode of lamp 10 is 3.83 while the $\acute{a}$ constant for the $3^{rd}$ azimuthal acoustic mode and higher azimuthal acoustic modes of lamp 10 are greater than 3.83. In particular, the $\acute{a}$ constant for the $3^{rd}$ azimuthal acoustic mode of lamp 10 is 4.20 and the $\acute{a}$ constant for the $4^{th}$ azimuthal acoustic mode of lamp 10 is 5.32. Thus, the frequencies $f_r$ for the $3^{rd}$ azimuthal acoustic mode and higher azimuthal acoustic modes of lamp 10 are greater than the frequency $f_r$ for the $1^{st}$ radial acoustic mode of lamp 10.

However, color mixing within lamp 10 is not achieved by a the $3^{rd}$ azimuthal acoustic mode and higher azimuthal acoustic modes of lamp 10, because each azimuthal acoustic mode of lamp 10 does not have any axial pressure dependence. Accordingly, a longitudinal component must be combined with the $3^{rd}$ azimuthal acoustic mode or higher azimuthal acoustic mode of lamp 10 to achieve color mixing within lamp 10. The present invention is based upon a combination frequency $f_{rl}$ that is equal to $(f_r^2+f_l^2)^{1/2}$, where $f_l$ is a frequency of a longitudinal acoustic mode of lamp 10 that is equal to $(nC_l)/(2l)$, where n is a longitudinal mode number, $C_l$ is an average speed of sound in an axial plane of lamp 10, and l is the inner length of lamp 10.

System 11 therefore provides current signal $CS_2$ with a frequency sweep having a center frequency approximating $((f_r^2+f_l^2)^{1/2})/2$, whereby a power frequency $f_{rl}$ of an azimuthal acoustic and longitudinal acoustic combination mode of lamp 10 is excited to thereby achieve color mixing within lamp 10. In one embodiment, system 11 provides current signal $CS_2$ with a frequency sweep corresponding to a power frequency $f_{rl}$ of an $3^{rd}$ or higher azimuthal acoustic and a $n^{th}$ longitudinal acoustic combination mode of lamp 10.

System 11 comprises a power source 20 including a bridge 21, e.g., a full bridge or a half bridge, and a low pass filter 22 for providing current signal $CS_1$ to lamp 10 during an initial operating period and current signal $CS_2$ to lamp 10 after the initial operating period. System 11 further comprises a controller 30 for controlling the provision of current signal $CS_1$ and current signal $CS_2$ to lamp 10. Controller 30 is an electronic circuit comprised of one or more components that are assembled as a common unit. Controller 30 may be comprised of digital circuitry, analog circuitry, or both. Also, controller 30 may be programmable, a dedicated state machine, or a hybrid combination of programmable and dedicated hardware. To implement the principals of the present invention, controller 30 can further include any control clocks, interfaces, signal conditioners, filters, Analog-to-Digital (A/D) converters, Digital-to-Analog (D/A) converters, communication ports, or other types of operators as would occur to those having ordinary skill in the art.

Figure 2:
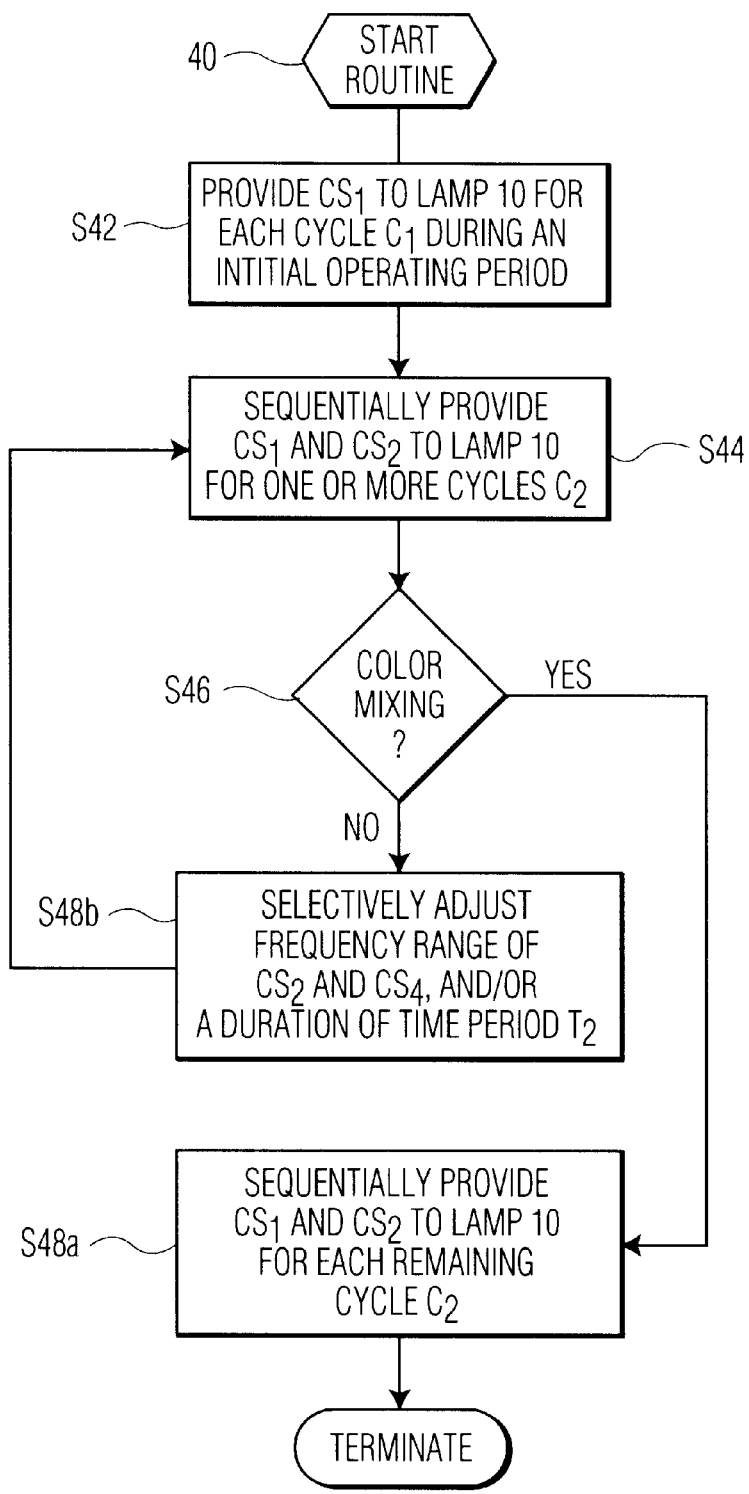
FIG. 2 is a flow chart of a first embodiment of a color mixing routine implemented by the FIG. 1 power source system.

In one embodiment, controller 30 includes an integrated processing unit (not shown) operatively coupled to one or more solid-state memory devices (not shown). The memory contains programming corresponding to a color mixing routine 40 as shown in FIG. 2, and is arranged for reading and writing of data in accordance with the principals of the present invention. Referring additionally to FIG. 2, routine 40 as implemented by system 11 will now be described herein. While the present invention does not impose any restrictions as to the dimensions of lamp 10, for purposes of describing routine 40, FIGS. 1–3B will be described herein as if lamp 10 has a 4 millimeter inner diameter and a 19 millimeter inner length. Accordingly, for purposes of describing routine 40, the current frequency for exciting the $1^{st}$ azimuthal acoustic mode of lamp 10 is 31.5 kilohertz; the current frequency for exciting the $1^{st}$ radial acoustic mode of lamp 10 is 65.5 kilohertz; the current frequency for exciting the $3^{rd}$ azimuthal acoustic mode of lamp 10 is 71.8 kilohertz; and the current frequency for exciting the $2^{nd}$ longitudinal acoustic mode of lamp 10 is 12 kilohertz. In addition, the center current frequency for exciting the $3^{rd}$ azimuthal acoustic and $n^{th}$ longitudinal acoustic combination mode of lamp 10 is approximately 75 kilohertz. For example, the current frequency for exciting the $3^{rd}$ azimuthal acoustic and $2^{nd}$ longitudinal acoustic combination mode of lamp 10 is 72.8 kilohertz, and the current frequency for exciting the $3^{rd}$ azimuthal acoustic and $4^{th}$ longitudinal acoustic combination mode of lamp 10 is 75.7 kilohertz. Those having ordinary skill in the art will appreciate the operation of routine 40 with other dimensional embodiments of lamp 10, and other azimuthal acoustic and longitudinal acoustic combination modes.

During a stage S42 of routine 40 that is an initial operating period of lamp 10, bridge 21 cyclically sweeps a current signal $CS_3$ in the form of a square wave as regulated by controller 30. In response, low pass filter 22 filters current signal $CS_3$ to cyclically sweep current signal $CS_1$ in the form of a sine wave. Current signal $CS_1$ and current signal $CS_3$ have a frequency range between 31.5 kilohertz and 65.5 kilohertz. In one embodiment, as exemplary illustrated in FIG. 3A, the frequency range of current signal $CS_1$ and current signal $CS_3$ is 45 kilohertz to 55 kilohertz for each cycle $C_1$ that occurs during the initial operating period. This facilitates an operation stabilization of lamp 10 during the initial operating period due to a corresponding power frequency sweep of 90 kilohertz to 110 kilohertz during each cycle $C_1$ as exemplary illustrated in FIG. 3B. In one embodiment, cycle $C_1$ is 10 milliseconds with the initial operating period being 2 minutes for stabilizing the operation of lamp 10. While current signal $CS_1$ is shown as having a positive ramp shape in FIG. 3A, those having ordinary skill in the art will appreciate that current signal $CS_1$ can have a negative ramp shape, a triangular shape, or any other shape within the spirit of the present invention.

Upon an expiration of the initial operating period, system 11 proceeds to stage S44 of routine 40. During stage S44, over one cycle $C_2$, bridge 21 sweeps current signal $CS_3$ and filter 22 sweeps current signal $CS_1$ for a first time period $T_1$ of a cycle $C_2$ as previously described herein. Subsequently, for a second time period $T_2$ of cycle $C_2$, bridge 21 cyclically sweeps a current signal $CS_4$ in the form of a square wave as regulated by controller 30. In response, low pass filter 22 filters current signal $CS_4$ with possibly a marginal attenuation to sweep current signal $\$_2$ in the form of a sine wave. In one embodiment, as exemplary illustrated in FIG. 3A, the frequency range of current signal $CS_1$ and current signal $CS_3$ is 45 kilohertz to 55 kilohertz during time period $T_1$, and the frequency range of current signal $CS_2$ and current signal $CS_4$ is centered around 75 kilohertz with a delta approximating 5 kilohertz during time period $T_2$.

Figure 3A:
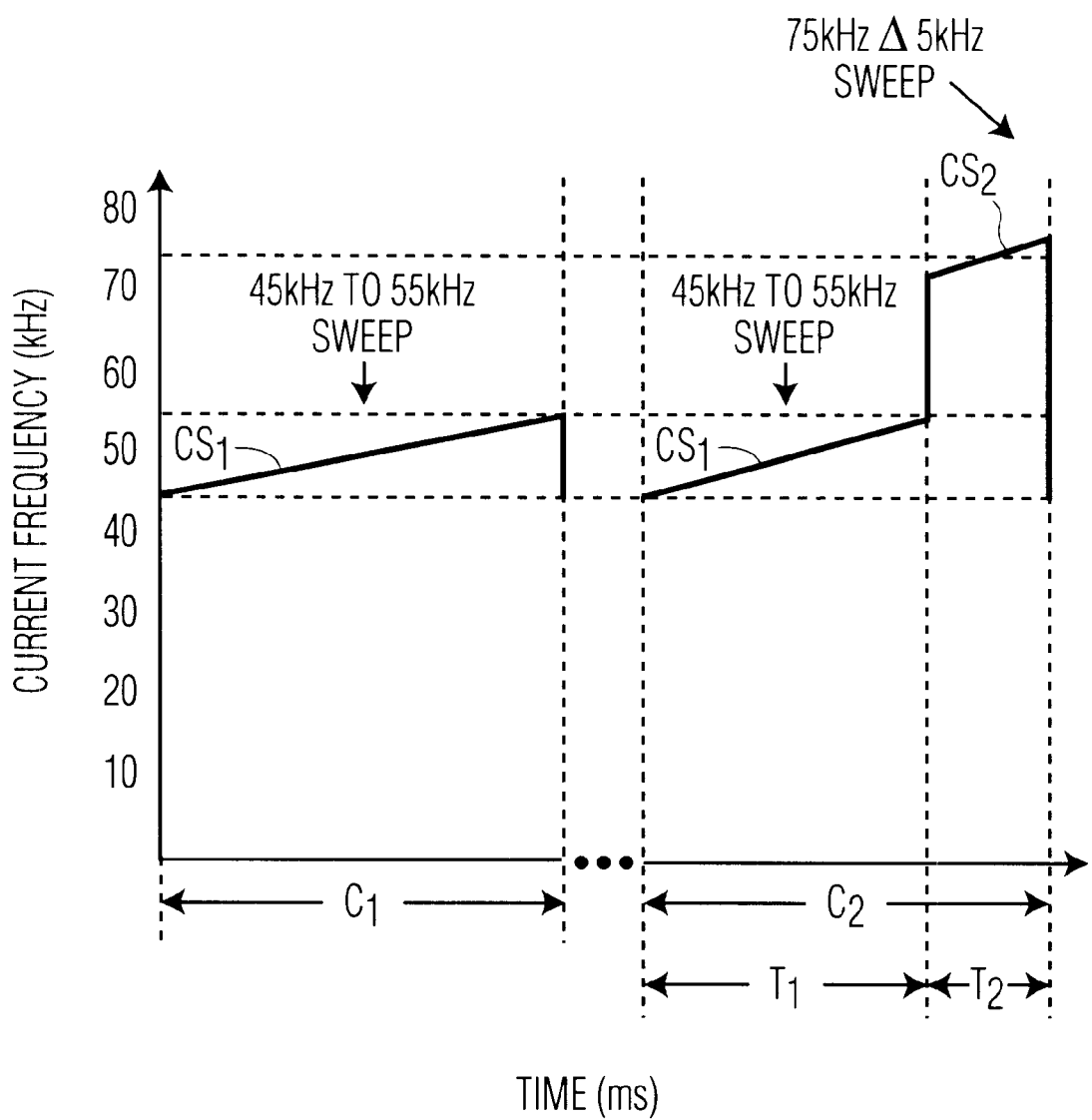
FIG. 3A is an exemplary plot of a current frequency spectrum generated by the FIG. 1 power source system.
Figure 3B:
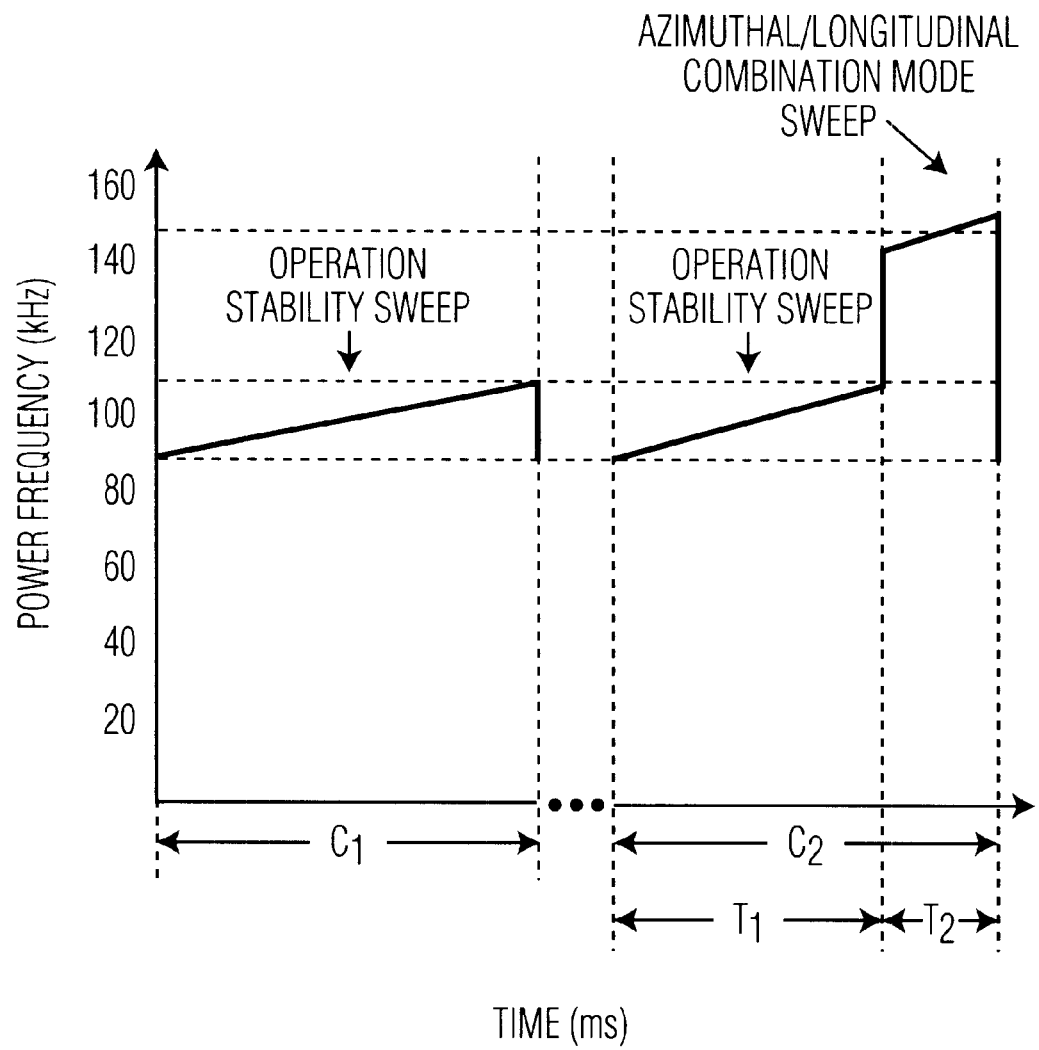
FIG. 3B is an exemplary plot of a power frequency spectrum corresponding to FIG. 3A current frequency spectrum.

This maintains the stable operation of lamp 10 during time period $T_1$, and facilitates an excitation of the $3^{rd}$ azimuthal acoustic and $n^{th}$ longitudinal acoustic combination mode of lamp 10 during time period $T_2$ due to a corresponding power frequency sweep centered around 150 kilohertz with a delta approximating 10 kilohertz during time period $T_2$ as exemplary illustrated in FIG. 3B. In one embodiment, cycle $C_2$ is 10 milliseconds with time period $T_1$ being 8.5 milliseconds to 9 milliseconds to maintain operational stability of lamp 10 and time period $T_2$ being 1 millisecond to 1.5 milliseconds to stabilize a color mixing within lamp 10.

While current signal $CS_2$ is shown as having a positive ramp shape in FIG. 3A, those having ordinary skill in the art will appreciate that current signal $CS_2$ can have a negative ramp shape, a triangular shape, or any other shape within the spirit of the present invention.

Upon completion of one or more cycles $C_2$, system 11 proceeds to stage S46 of routine 40. In one embodiment, a duration of stage S44 is 0.5 seconds with cycle $C_2$ being 10 milliseconds whereby cycle $C_2$ occurs 50 times during stage S44.

During stage S46, controller 30 determines if color mixing is occurring within lamp 10. In one embodiment, controller 30 reads voltage signal $V_S$ from lamp 10 at the end stage S42, and then reads voltage signal $V_S$ at the end of the stage S44. An increase in the readings from stage S42 to stage S44 is an indication of color mixing within lamp 10.

The following TABLE 1 exemplary illustrates color mixing within lamp 10 as achieved by system 11:

TABLE 1

| STAGE | VS$_1$ |
| --- | --- |
| S42 (45–55 kHz sweep) | 189.6 volts |
| S44 (45–55 kHz sweep followed by a 75 kHz 5 kHz sweep) | 194.7 volts |

The 5.1 volt increase in voltage signal VS$_1$ from stage S42 to stage S44 is an indication of color mixing within lamp 10.

The following TABLE 2 further exemplary illustrates color mixing within lamp 10 in a vertical orientation as achieved by system 11:

TABLE 2

| STAGE | COLOR TEMPERATURE | CRI | X COORDINATE | y COORDINATE | EFFICACY |
| --- | --- | --- | --- | --- | --- |
| S42 | 3899° K. | 65.2 | .405 | .448 | 91 LPW |
| S44 | 3018° K. | 75.7 | .443 | .419 | 110 LPW |

Stage S44 decreases the color temperature by 881° K. and the y coordinate by 0.029. Stage S44 also increases the color rending index (CRI) by 10.5, the x coordinate by 0.038, and the efficacy by 19 lumens per watt (LPW).

System 11 proceeds to a stage S48a whenever controller 30 determines that color mixing is occurring within lamp 10 during stage S46. Stage S48a is a cyclical repeat of stage S44 that is terminated upon a termination of an operation of lamp 10.

System 11 proceeds to stage S48b of routine 40 when controller 30 determines that color mixing is not occurring within lamp 10 during stage S46. During stage S48b, controller 30 selectively adjusts either the frequency range of current signal CS$_2$ and current signal CS$_4$, and/or a duration of time period T$_2$ in which bridge 21 generates current signal CS$_4$ and filter 22 sweeps current signal CS$_2$. Controller 30 provides adjustment signal AS$_1$ to bridge 21 to control the selected adjustment(s). System 11 thereafter returns to stage S44 to repeat stage S44 and stage S46.

Figure 4:
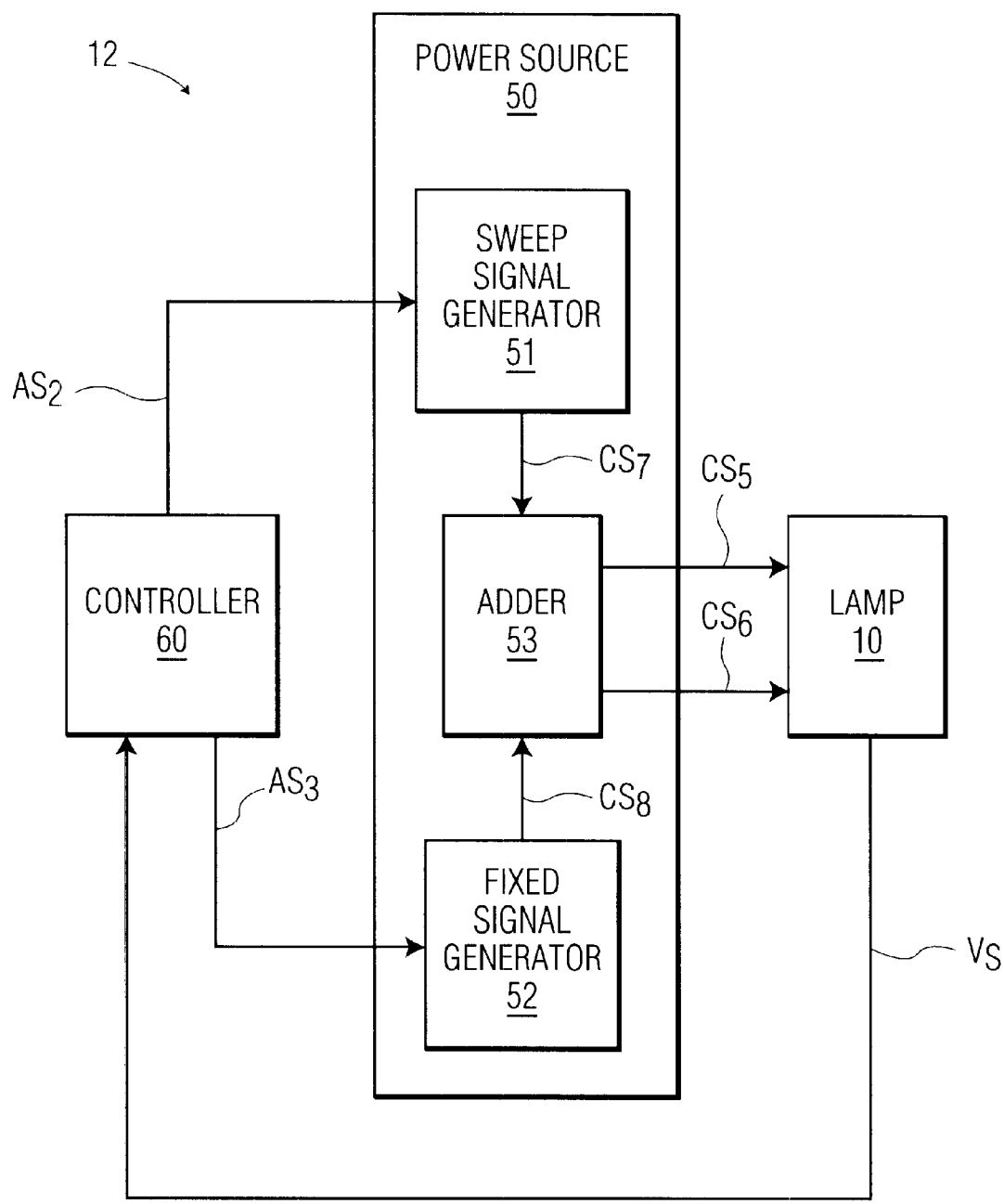
FIG. 4 is a block diagram of a second embodiment of a power source system employed to drive a gas discharge lamp in accordance with the present invention.

Referring to FIG. 4, a power source system 12 for stabilizing an operation lamp 10 and for reducing vertical segregation (color mixing) within lamp 10 is shown.

System 12 provides a current signal CS$_5$ to lamp 10 during an initial operating period of lamp 10, whereby operational stabilization of lamp 10 is achieved by current signal CS$_5$ having a frequency sweep that corresponds to a power frequency sweep (which is twice the frequency sweep of current signal CS$_5$) between the frequency of the 1$^{st}$ azimuthal acoustic mode of lamp 10 and the frequency of the 1$^{st}$ radial acoustic mode of lamp 10. System 12 thereafter provides current signal CS$_6$ in place of current signal CS$_5$ to lamp 10, whereby operational stabilization and color mixing within lamp 10 are achieved by current signal CS$_6$ resulting in a power frequency sweep between the frequency of the 1$^{st}$ azimuthal acoustic mode of lamp 10 and the frequency of the 1$^{st}$ radial acoustic mode of lamp 10, and a power frequency sweep to excite an azimuthal acoustic and longitudinal acoustic combination mode of lamp 10 that is above the frequency of the 1$^{st}$ radial acoustic mode of lamp 10. In one embodiment, system 12 provides current signal CS$_6$ whereby the resulting power frequency to achieve color mixing within lamp 10 excites a 3$^{rd}$ or higher azimuthal acoustic and an n$^{th}$ longitudinal acoustic combination mode of lamp 10.

System 12 comprises a power source 50 including sweep signal generator 51, a fixed signal generator 52, and an adder 53 for providing current signal CS$_5$ to lamp 10 during the initial operating period and current signal CS$_6$ to lamp 10 after the initial operating period. System 12 further comprises a controller 60 for controlling the provision of current signal CS$_5$ and current signal CS$_6$ to lamp 10. Controller 60 is an electronic circuit comprised of one or more components that are assembled as a common unit. Controller 60 may be comprised of digital circuitry, analog circuitry, or both. Also, controller 60 may be programmable, a dedicated state machine, or a hybrid combination of programmable and dedicated hardware. To implement the principals of the present invention, controller 60 can further include any control clocks, interfaces, signal conditioners, filters, Analog-to-Digital (A/D) converters, Digital-to-Analog (D/A) converters, communication ports, or other types of operators as would occur to those having ordinary skill in the art.

In one embodiment, controller 60 includes an integrated processing unit (not shown) operatively coupled to one or more solid-state memory devices (not shown).

Figure 5:
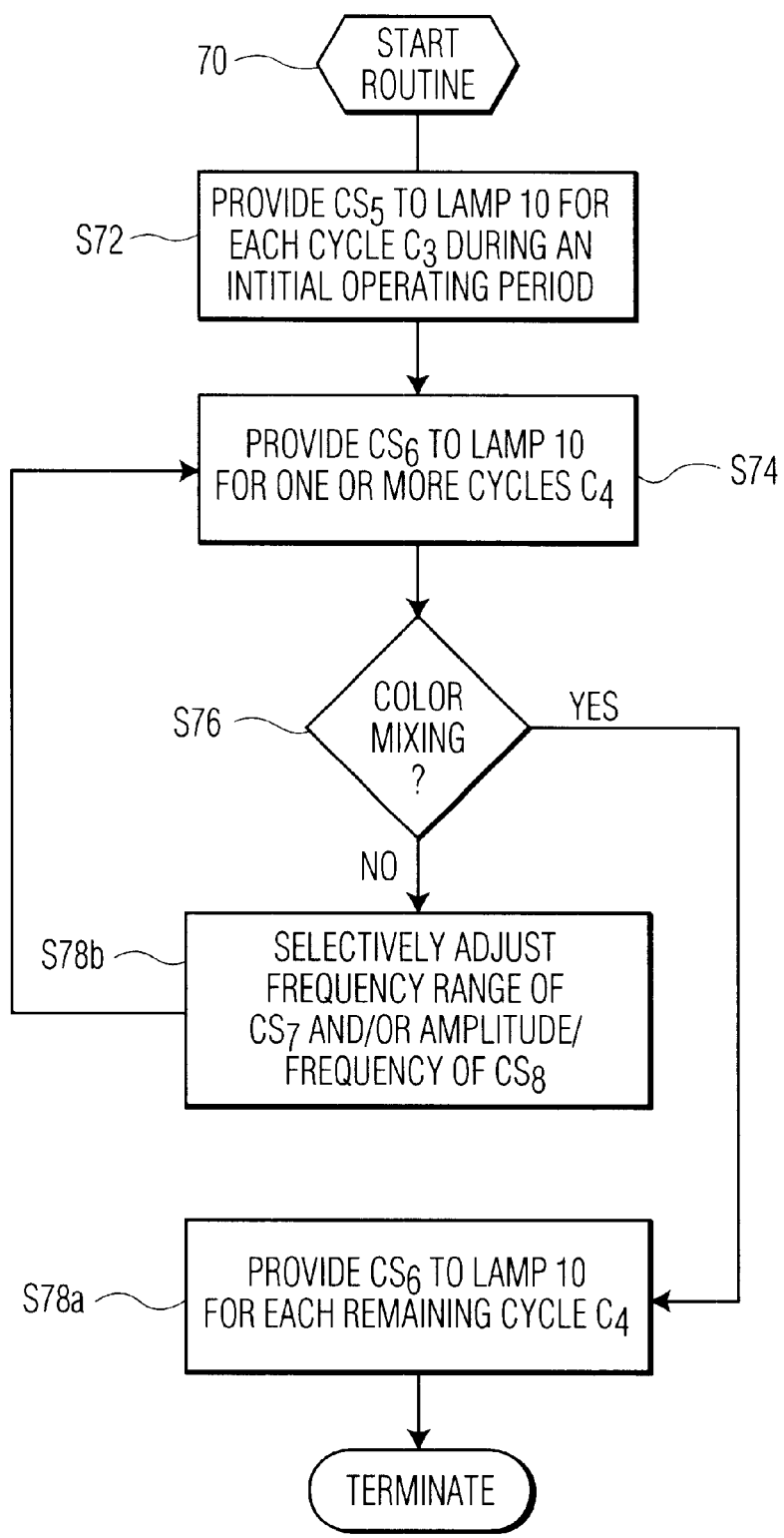
FIG. 5 is a flow chart of a second embodiment of a color mixing routine implemented by the FIG. 4 power source system.

The memory contains programming corresponding to a color mixing routine 70 as illustrated in FIG. 5, and is arranged for reading and writing of data in accordance with the principals of the present invention.

Referring additionally to FIG. 5, routine 70 as implemented by system 12 will now be described herein. Again, while the present invention does not impose any restrictions as to the dimensions of lamp 10, for purposes of describing routine 70, FIGS. 4–6C will be described herein as if lamp 10 has a 4 millimeter inner diameter and a 19 millimeter inner length. Accordingly, for purposes of describing routine 40, the current frequency for exciting the 1$^{st}$ azimuthal acoustic mode of lamp 10 is 31.5 kilohertz; the current frequency for exciting the 1$^{st}$ radial acoustic mode of lamp 10 is 65.5 kilohertz; the current frequency for exciting the 3$^{rd}$ azimuthal acoustic mode of lamp 10 is 71.8 kilohertz; and the current frequency for exciting the 2$^{nd}$ longitudinal acoustic mode of lamp 10 is 12 kilohertz. In addition, the center current frequency for exciting the 3$^{rd}$ azimuthal acoustic and n$^{th}$ longitudinal acoustic combination mode of lamp 10 is approximately 75 kilohertz. For example, the current frequency for exciting the 3$^{rd}$ azimuthal acoustic and 2$^{nd}$ longitudinal acoustic combination mode of lamp 10 is 72.8 kilohertz, and the current frequency for exciting the 3$^{rd}$ azimuthal acoustic and 4$^{th}$ longitudinal acoustic combination mode of lamp 10 is 75.7 kilohertz. Those having ordinary skill in the art will appreciate the operation of routine 70 with other dimensional embodiments of lamp 10, and other azimuthal acoustic and longitudinal acoustic combination modes.

During a stage S72 of routine 70 that is an initial operating period of lamp 10, generator 51 cyclically sweeps a current signal CS$_7$ in the form of a sine wave and generator 52 is inactive as regulated by controller 60. In one embodiment, in response thereto, adder 53 cyclically sweeps current signal CS$_7$ as current signal CS$_5$. Current signal CS$_5$ and current signal CS$_7$ have a frequency range between 31.5 kilohertz and 65.5 kilohertz. In one embodiment, as exemplary illustrated in FIG. 6A for current signal CS$_7$, the frequency range of current signal CS$_5$ and current signal CS$_7$ is 45 kilohertz to 55 kilohertz for each cycle C$_3$ that occurs during the initial operating period. This facilitates an operation stabilization of lamp 10 during the initial operating period due to a corresponding power frequency sweep of 90 kilohertz to 110 kilohertz during each cycle C$_3$ as exemplary illustrated in FIG. 6B. In one embodiment, cycle $C_3$ is 10 milliseconds with the initial operating period being approximately 2 minutes for stabilizing the operation of lamp 10. While current signal $CS_7$ is shown as having a positive ramp shape in FIG. 6A, i.e., current signal $CS_5$ also has a positive ramp shape, those having ordinary skill in the art will appreciate that current signal $CS_5$ and/or current signal $CS_7$ can have a negative ramp shape, a triangular shape, or any other shape within the spirit of the present invention.

Upon an expiration of the initial operating period, system 12 proceeds to a stage S74 of routine 70. During stage S74, over one cycle $C_4$, generator 51 sweeps current signal $CS_7$ over a frequency range $f_{re}$, and generator 52 outputs a current signal $CS_8$ at a fixed frequency $f_f$ as regulated by controller 60. In one embodiment, in response thereto, adder 53 adds current signal $CS_7$ and current signal $CS_8$ to generate current signal $CS_6$, whereby power frequency spectrum resulting from current signal $CS_6$ is $2f_{re}$, $f_f-f_{re}$, $f_f+f_{re}$, and $2f_f$. In one embodiment, during cycle $C_4$ as exemplary illustrated in FIG. 6A, current signal $CS_7$ has a frequency range of 45 kilohertz to 55 kilohertz, and current signal $CS_8$ is generated at 200 kilohertz. As a result, as exemplary illustrated in FIG. 6b, the power frequency spectrum resulting from current signal $CS_6$ is a 90 kilohertz to 110 kilohertz sweep to stabilize the operation of lamp 10 during cycle $C_4$, a 145 kilohertz to 155 kilohertz sweep to excite a $3^{rd}$ azimuthal acoustic and $n^{th}$ longitudinal acoustic combination mode of lamp 10 during cycle $C_4$, a 245 kilohertz to 255 kilohertz sweep, and a fixed frequency of 400 kilohertz. Thus, during cycle $C_4$, the stable operation of lamp 10 is maintained and the excitation of the $3^{rd}$ azimuthal acoustic and $n^{th}$ longitudinal acoustic combination mode of lamp 10 is achieved.

Figure 6A:
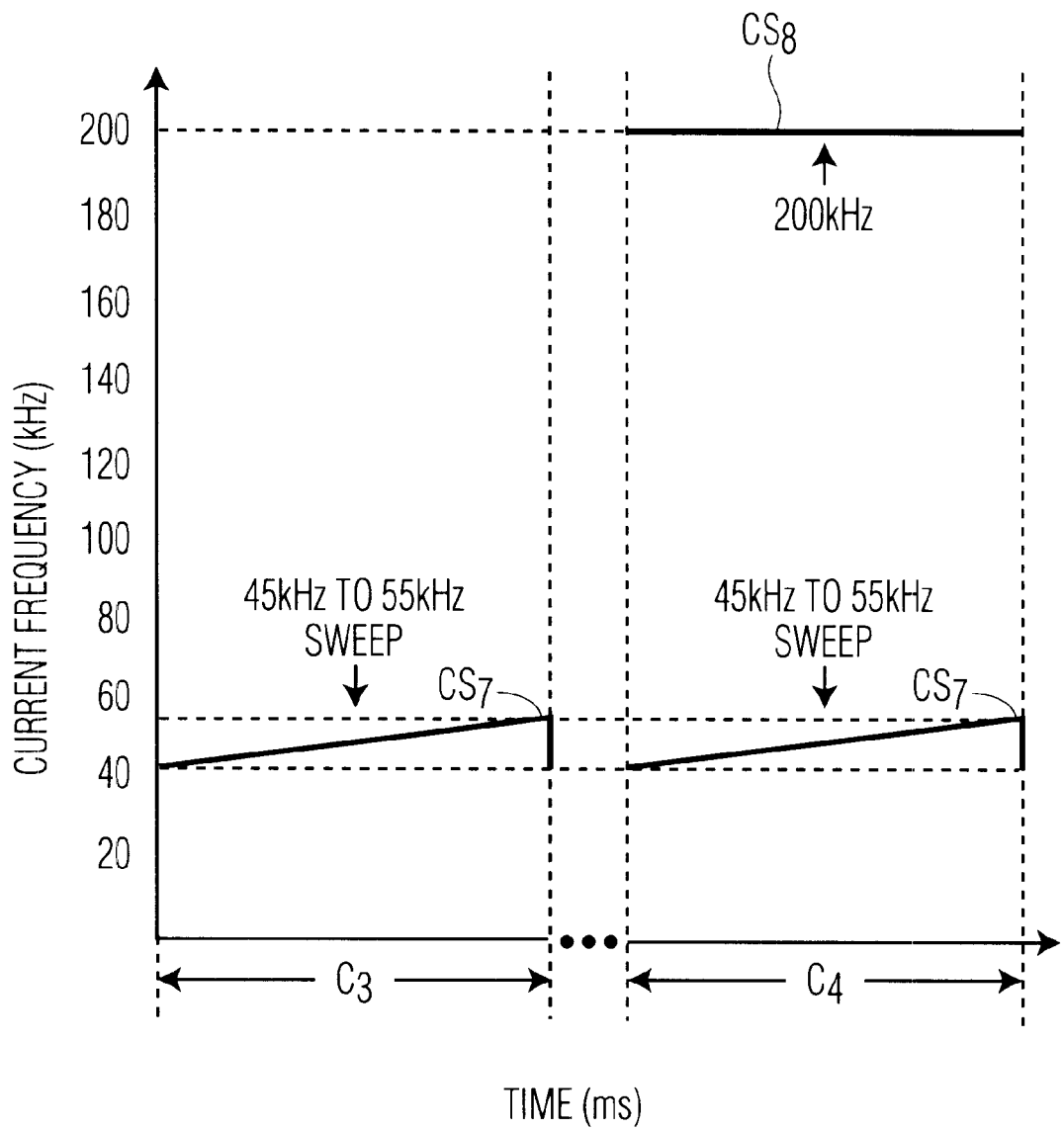
FIG. 6A is an exemplary plot of a pair of current signals as generated by the FIG. 4 power source system.
Figure 6B:
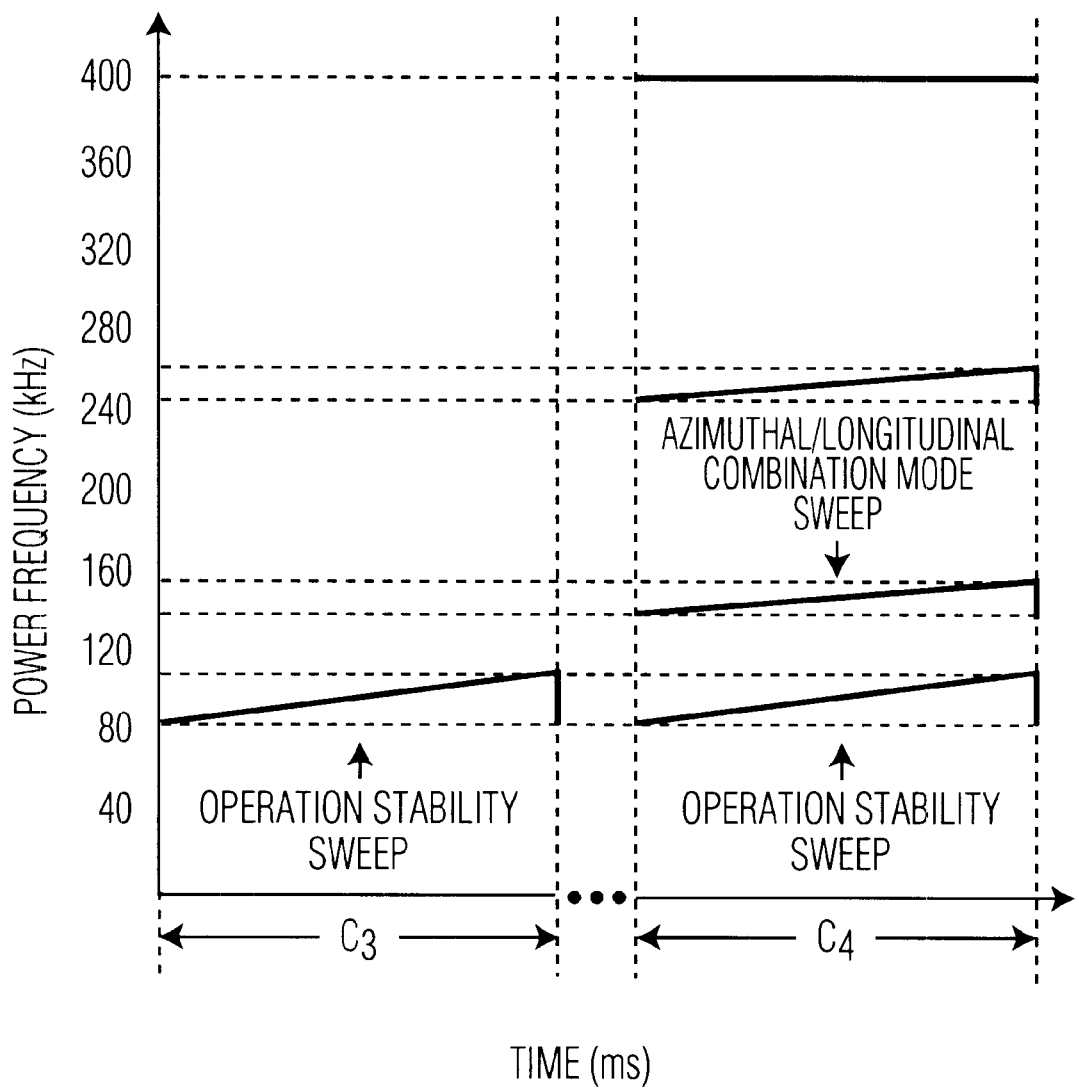
FIG. 6B is an exemplary plot of a power frequency spectrum corresponding to a current signal of the FIG. 4 power source system.

While current signal $CS_7$ is shown in FIG. 6A as having a positive ramp shape, those having ordinary skill in the art will appreciate that current signal $CS_7$ can have a negative ramp shape, a triangular shape, or any other shape within the spirit of the present invention.

Upon completion of one or more cycles $C_4$, system 12 proceeds to a stage S76 of routine 70. In one embodiment, a duration of stage S74 is 0.5 seconds with cycle $C_4$ being 10 milliseconds whereby cycle $C_4$ occurs 50 times during stage S74.

During stage S76, controller 60 determines if color mixing is occurring within lamp 10. In one embodiment, controller 60 reads voltage signal $V_S$ from lamp 10 at the in end stage S72, and then reads voltage signal $V_S$ at the end of the stage S74. An increase in the readings from stage S72 to stage S74 is an indication of color mixing within lamp 10. System 12 achieves equivalent color mixing indications as illustrated in TABLE 1 and TABLE 2 for system 11 (FIG. 1).

System 12 proceeds to a stage S78a whenever controller 60 determines that color mixing is occurring within lamp 10 during stage S76. Stage S76 is a cyclical repeat of stage S74 that is terminated upon a termination of an operation of lamp 10.

System 12 proceeds to stage S78b of routine 70 when controller 60 determines that color mixing is not occurring within lamp 10 during stage S76. During stage S78b, controller 60 selectively adjusts either the frequency range of current signal $CS_7$, an amplitude of current signal $CS_8$, and/or a fixed frequency of current signal $CS_8$. Controller 60 provides an adjustment signal $AS_2$ to generator 51 to control any frequency range adjustments of current signal $CS_7$. Controller 60 provides an adjustment signal $AS_3$ to generator 52 to control any frequency range adjustments of current signal $CS_7$, and any amplitude and/or frequency adjustments of current signal $CS_8$. System 12 thereafter returns to stage S74 to repeat stage S74 and stage S76.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

I claim:

1. A system for reducing vertical segregation in a high intensity discharge lamp, said system comprising:

a power source operable to provide a current frequency signal to the lamp, said first current frequency signal to excite an azimuthal acoustic and longitudinal acoustic combination mode of the lamp; and a controller operable to control said first current frequency signal to stabilize a reduction of vertical segregation within the lamp.

2. The system of claim 1, wherein said current frequency signal is swept over a frequency range to excite said azimuthal acoustic and longitudinal acoustic combination mode of the lamp; and said controller is operable to adjust said frequency range to thereby stabilize said reduction of vertical segregation within the lamp.

3. The system of claim 1, wherein said power source is operable to generate a current frequency sweep signal in the form of a square wave; and said power source is operable to generate said current frequency sweep signal in the form of a swept sine wave as a function of said first current frequency sweep signal.

4. The system of claim 3, wherein said current frequency sweep signal has a frequency range; and said controller is operable to adjust said frequency range of said current frequency sweep signal to thereby stabilize said reduction of vertical segregation within the lamp.

5. The system of claim 1, wherein said power source is operable to provide said current frequency signal as first current frequency sweep signal to the lamp during a first time period, said first current frequency sweep signal having a first frequency range to excite said azimuthal acoustic and longitudinal acoustic combination mode of the lamp; and said power source is operable to provide a second current frequency sweep signal to the lamp during a second time period, said second current frequency sweep signal having a second frequency range to stabilize an operation of the lamp.

6. The system of claim 5, wherein said controller is operable to adjust said first time period to thereby stabilize said reduction of vertical segregation within the lamp.

7. The system of claim 1, wherein said power source is operable to provide said current frequency signal as a function of a fixed current frequency signal and a current frequency sweep signal.

8. The system of claim 7, wherein said controller is operable to adjust an amplitude of said fixed current frequency signal to thereby stabilize said reduction of vertical segregation within the lamp.

9. The system of claim 7, wherein
said controller is operable to adjust a frequency of said fixed current frequency signal to thereby stabilize said reduction of vertical segregation within the lamp.

10. The system of claim 7, wherein
said current frequency sweep signal has a second frequency range to stabilize an operation of the lamp; and
said controller is operable to adjust said second frequency range of said current frequency sweep signal to thereby stabilize said reduction of vertical segregation within the lamp.

11. A power source for reducing vertical segregation in a high intensity discharge lamp, said power source comprising:
a bridge operable to provide a first current frequency sweep signal in the form of a square wave; and
a low pass filter operable to provide a second current frequency sweep signal in the form a sine wave in response to said first current frequency sweep signal to the lamp, said second current frequency sweep signal having a first frequency range to excite an azimuthal acoustic and longitudinal acoustic combination mode of the lamp.

12. The power source of claim 11, wherein
said first frequency range is adjustable to stabilize a reduction in vertical segregation within the lamp.

13. The power source of claim 11, wherein
said bridge is further operable to provide a third current frequency sweep signal in the form of a square wave; and
said low pass filter is further operable to provide a fourth current frequency sweep signal in the form a sine wave in response to said third current frequency sweep signal to the lamp, said fourth current frequency sweep signal having a second frequency range to stabilize an operation of the lamp.

14. The power source of claim 13, wherein
said low pass filter provides said second current frequency sweep signal to the lamp during a first time period; and
said low pass filter provides said fourth current frequency sweep signal to the lamp during a second time period.

15. The power source of claim 14, wherein
said first time period is adjustable to stabilize a reduction in vertical segregation within the lamp.

16. A power source for reducing vertical segregation in a high intensity discharge lamp, said power source comprising:
a first signal generator operable to provide a fixed current frequency signal;
a second signal generator operable to provide a current frequency sweep signal; and
an adder operable to provide a current frequency signal as a function of said fixed current frequency signal and said current frequency sweep signal to the lamp, said current frequency signal to excite an azimuthal acoustic and longitudinal acoustic combination mode of the lamp.

17. The power source of claim 16, wherein
an amplitude of said fixed current frequency signal is adjustable to stabilize a reduction in vertical segregation within the lamp.

18. The power source of claim 16, wherein
a frequency of said fixed current frequency signal is adjustable to stabilize a reduction in vertical segregation within the lamp.

19. The power source of claim 16, wherein
said current frequency sweep signal has a frequency range that is adjustable to stabilize a reduction in vertical segregation within the lamp.

20. A method for reducing vertical segregation in a high intensity discharge lamp, said method comprising:
providing a current frequency signal to the lamp, said current frequency signal having to excite an azimuthal acoustic and longitudinal acoustic combination mode of the lamp; and
controlling said current frequency signal to stabilize a reduction of vertical segregation within the lamp.

21. The method of claim 20, further comprising:
providing a current frequency sweep signal to the lamp, said current frequency sweep signal having a frequency range to stabilize an operation of the lamp.

22. The method of claim 21, further comprising:
generating said current frequency sweep signal during a first time period;
to generating said current frequency signal during a second time period; and
adjusting said second time period to thereby stabilize said reduction of vertical segregation within the lamp.

23. The method of claim 20, wherein
generating a current frequency sweep signal in a form of a square wave, said current frequency sweep signal having a frequency range to excite said azimuthal acoustic and longitudinal acoustic combination mode of the lamp; and
generating said current frequency signal in a form of a swept sine wave as a function of said current frequency sweep signal.

24. The method of claim 23, further comprising:
adjusting said frequency range of said current frequency sweep signal to thereby stabilize said reduction of vertical segregation within the lamp.

25. The method of claim 20, further comprising:
generating a fixed current frequency signal;
generating a current frequency sweep signal; and
generating said current frequency signal as a function of said fixed current frequency signal and said current frequency sweep signal.

26. The method of claim 25, further comprising:
adjusting an amplitude of said fixed current frequency signal to thereby stabilize said reduction of vertical segregation within the lamp.

27. The method of claim 25, further comprising:
adjusting a frequency of said fixed current frequency signal to thereby stabilize said reduction of vertical segregation within the lamp.

28. The method of claim 25, further comprising:
adjusting a frequency range of said second current frequency sweep signal to thereby stabilize said reduction of vertical segregation within the lamp.

29. A method for reducing vertical segregation in a high intensity discharge lamp, said method comprising:
providing a first current frequency sweep signal in the form of a square wave; and
providing a second current frequency sweep signal to the lamp in the form a sine wave in response to said first current frequency sweep signal, said second current frequency sweep signal having a first frequency range to excite an azimuthal acoustic and longitudinal acoustic combination mode of the lamp.

30. The method of claim 29, further comprising:

adjusting said first frequency range to stabilize a reduction of vertical segregation within the lamp.

31. The method of claim 29, further comprising:

generating said second current frequency sweep signal during a time period; and adjusting a duration of said time period to stabilize a reduction of vertical segregation within the lamp.

32. A method for reducing vertical segregation in a high intensity discharge lamp, said method comprising:

providing a first current frequency sweep signal to the lamp during a first time period, said first current frequency sweep signal having a first frequency range to stabilize an operation of the lamp; and providing a second current frequency sweep signal to the lamp during a second time period, said second current frequency sweep signal having a second frequency range to excite an azimuthal acoustic and longitudinal acoustic combination mode of the lamp.

33. The method of claim 32, further comprising:

adjusting said second frequency range to stabilize a reduction of vertical segregation within the lamp.

34. The method of claim 32, further comprising:

adjusting a duration of said second time period to stabilize a reduction of vertical segregation within the lamp.

35. A method for reducing vertical segregation in a high intensity discharge lamp, said method comprising:

providing a fixed current frequency signal;

providing a current frequency sweep signal; and providing a current frequency signal as a function of said fixed current frequency signal and said current frequency sweep signal to the lamp, said current frequency signal to excite an azimuthal acoustic and longitudinal acoustic combination mode of the lamp.

36. The method of claim 35, further comprising:

adjusting an amplitude of said fixed current frequency signal to stabilize a reduction of vertical segregation within the lamp.

37. The method of claim 35, further comprising:

adjusting a frequency of said fixed current frequency signal to stabilize a reduction of vertical segregation within the lamp.

38. The method of claim 35, further comprising:

adjusting a frequency range of said current frequency sweep signal to stabilize a reduction of vertical segregation within the lamp.

39. A computer program product in a computer readable medium for controlling a reduction of a vertical segregation within a high intensity discharge lamp, said computer program product comprising:

a means for controlling a provision of a first current frequency sweep signal to the lamp during a cycle, said first current frequency sweep having a first frequency range to stabilize an operation of the lamp; and a means for controlling a provision of a second current frequency sweep signal to the lamp during said cycle, said second current frequency sweep having a second frequency range to excite an azimuthal acoustic and longitudinal acoustic combination mode of the lamp.

40. A computer program product in a computer readable medium for controlling a reduction of a vertical segregation within a high intensity discharge lamp, said computer program product comprising:

a means for controlling a provision of a current frequency sweep signal to the lamp during a first cycle, said first current frequency sweep having a frequency range to stabilize an operation of the lamp; and a means for controlling a provision of a current frequency signal to the lamp during a second cycle, said current frequency signal to excite an azimuthal acoustic and longitudinal acoustic combination mode of the lamp.

* * * * *